United States Patent [19]

Nagamine et al.

[11] Patent Number: 4,773,040

[45] Date of Patent: Sep. 20, 1988

[54] DATA TRANSMISSION METHOD AND APPARATUS THEREFOR

[75] Inventors: Tsuyoshi Nagamine; Nobuyuki Kiya, both of Tokyo, Japan

[73] Assignee: Fanuc Ltd., Minamitsuru, Japan

[21] Appl. No.: 782,712

[22] PCT Filed: Jan. 29, 1985

[86] PCT No.: PCT/JP85/00035

§ 371 Date: Sep. 23, 1985

§ 102(e) Date: Sep. 23, 1985

[87] PCT Pub. No.: WO85/03396

PCT Pub. Date: Aug. 1, 1985

[30] Foreign Application Priority Data

Jan. 30, 1984 [JP] Japan .................. 59-14935

[51] Int. Cl.$^4$ ............ H04L 11/06; G06F 13/38
[52] U.S. Cl. .................. 364/900; 340/825.2
[58] Field of Search .......... 340/825.06, 825.07, 340/825.08, 825.2; 364/178, 200 MS File, 900 MS File; 375/7, 8

[56] References Cited

U.S. PATENT DOCUMENTS

| | | | |
|---|---|---|---|
| 3,676,858 | 7/1972 | Finch et al. | 364/200 |
| 4,156,798 | 5/1979 | Doelz | 364/200 X |
| 4,375,103 | 2/1983 | Arneth et al. | 364/900 X |

FOREIGN PATENT DOCUMENTS 50-45530 4/1975 Japan .

*Primary Examiner*—Thomas M. Heckler
*Attorney, Agent, or Firm*—Staas & Halsey

[57] ABSTRACT

The present invention provides a data transmission method for sending parallel data from a transmitting side to a receiving side. After transmitting an i-th item of data ($DT_i$), the transmitting side sends a high-level data transmission signal (DS) to the receiving side at the expiration of a predetermined period of time ($t_1$). In response to receipt of the high-level data transmission signal (DS), the receiving side reads the i-th item of data ($DT_i$) and sends a high-level data reception signal (DR) to the transmitting side. The transmitting side ends the transmission cycle for the i-th item of data upon receiving the high-level data reception signal (DR). After transmitting the next or (i+1)th item of data ($DT_{i+1}$), the transmitting side sends a low-level data transmission signal (DS) at the expiration of the predetermined period of time ($t_1$). In response to receipt of the low-level data transmission signal (DS), the receiving side reads the (i+1)th item of data ($DT_{i+1}$) and sends a low-level data reception signal (DR) to the transmitting side. The transmitting side ends the transmission cycle for the (i+1)th item of data upon receiving the low-level data reception signal (DR). In subsequent data transmission, data are successively transmitted by repeating th i-th and (i+1)th data transmission cycles.

13 Claims, 2 Drawing Sheets

DATA TRANSMISSION METHOD AND APPARATUS THEREFOR

BACKGROUND OF THE INVENTION

1. Field of the Invention

This invention relates to a data transmission method and, more particularly, to a data transmission method capable of shortening data transmission time.

2. Description of the Related Art

In a system equipped with a machine such as a machine tool or robot and a numerical control unit (referred to as an "NC unit"), desired machining control or robot service control is carried out while the machine and NC unit exchange signals with each other. As an example, if a miscellaneous function instruction (M-function instruction), tool change instruction (T-function instruction) and spindle rotational velocity instruction (S-function instruction) to be sent from an NC tape or the like to the machine side are read, the NC unit sends these instructions to the machine, and the machine receives these instructions, executes a machining operation designated by the instructions and, with the completion of the machining operation, sends an operation completion signal back to the NC unit. Sensors and various limit switches such as a limit switch for overtravel detection and a limit switch for deceleration are attached to the machine, and the states of these limit switches and sensors are sent to the NC unit, in response to which the NC unit executes predetermined processing.

In a case where parallel data (assumed here to be m-bit data) from the NC unit to the machine are transmitted on m-number of transmission lines, there are occasions where not all bits of the parallel data arrive at the machine simultaneously. There are various reasons for this, such as a disparity in the delay exhibited by receivers provided in the machine. Accordingly, as shown in FIGS. 1 and 2, an arrangement is adopted in which an NC unit 101 sends parallel data DT to a machine 102 via m-number of transmission lines Lm and then, at expiration of a predetermined period of time $t_1$, sends a data transmission signal DS to the machine via a transmission line Ls, with the machine 102 responding to the receipt of the data transmission signal Ds by reading the parallel data DT. The predetermined period of time $t_1$ is that amount of time needed for all bits of the parallel data DT to arrive in unison at the machine. After reading the parallel data DT, the machine 102 sends a data reception signal DR to the NC unit 101 via a transmission line Lr, and the NC unit 101 sets the data transmission signal DS to a low level upon receiving the data reception signal DR. The machine 102 sets the data reception signal DR to the low level in response to the low level to which the data transmssion signal DS has been set. The foregoing processing ends the transmission cycle for one item of parallel data and places the NC unit 101 in a state capable of transmitting the next item of parallel data. Thereafter, items of parallel data are transmitted successively through identical cycles of operation.

Thus, according to the conventional transmission method, one item of parallel data is transmitted through a cycle comprising:

(1) transmitting the parallel data DT;
(2) sending the data transmission signal DS;
(3) reading the parallel data and sending back the data reception signal DR;
(4) setting the data transmission signal DS to the low level; and
(5) setting the data reception signal DR to the low level.

Consequently, though the data can be transmitted in a reliable manner, a long period of time is required for the transmission. This is the drawback of the conventional method.

SUMMARY OF THE INVENTION

An object of the present invention is to provide a data transmission method whereby data can be transmitted reliably and in a shorter period of time.

Another object of the present invention is to provide a data transmission method wherein a transmission cycle for a first item of parallel data is completed by the three steps of:

(1) transmitting parallel data DT;
(2) sending a data transmission signal of a high level (e.g., logical "1"); and
(3) reading the parallel data in response to receipt of the high-level data transmission signal and sending back a high-level data reception signal; a subsequent transmission cycle is completed by the three steps of:

(1)' transmitting parallel data DT;
(2)' sending a data transmission signal of a low level (e.g., logical "0"); and
(3)' reading the parallel data in response to receipt of the low-level data transmission signal and sending back a low-level data reception signal; and data transmission is subsequently carried out by repeating the transmission cycles of the first and second parallel data each time a parallel data transfer takes place, thereby enabling the data transmission time to be shortened.

The present invention thus includes the following method.

After transmitting an i-th item of data, the transmitting side sends a high-level data transmission signal to the receiving side at the expiration of a predetermined period of time. In response to receipt of the high-level data transmission signal, the data receiving side reads the i-th item of data and sends a high-level data reception signal to the transmitting side. The transmitting side ends the transmission cycle for the i-th item of data upon receiving the high-level data reception signal. After transmitting the next or (i+1)th item of data, the transmitting side sends a low-level data transmission signal at the expiration of a predetermined period of time. In response to receipt of the low-level data transmission signal, the receiving side reads the (i+1)th item of data and sends a low-level data reception signal to the transmitting side. The transmitting side ends the transmission cycle for the (i+1)th item of data upon recieving the low-level data reception signal. In subsequent data transmissions, data are successively transmitted by repeating the i-th and (i+1)th data transmission cycles. According to the present invention, there are fewer data transmission cycle steps, enabling data to be transmitted in a shorter time.

DESCRIPTION OF THE PREFERRED EMBODIMENTS

Figure 1:
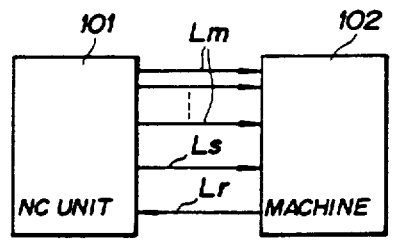
FIGS. 1 and 2 are views for describing a conventional data transmission method.
Figure 2:
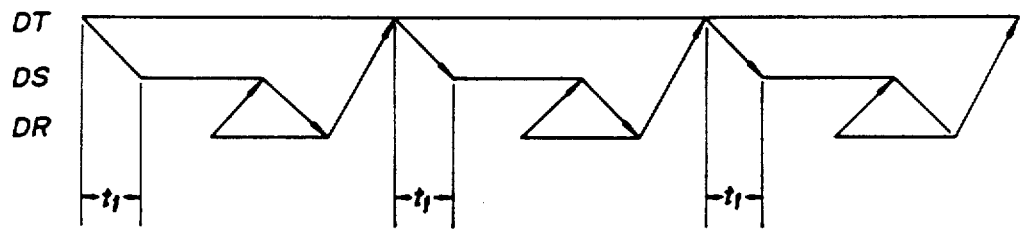
Figure 3:
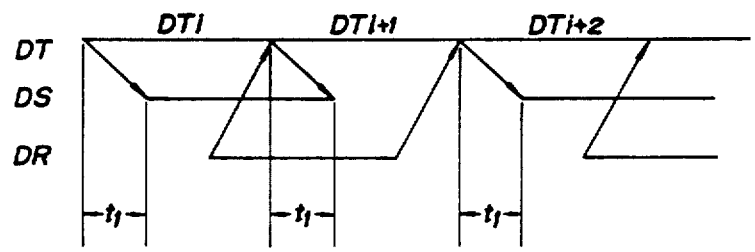
FIG. 3 is a time chart for describing a data transmission method according to the present invention.

FIG. 3 is a view for describing a data transmission method according to the present invention. After transmitting an i-th item of data $DT_i$, the transmitting side sends a high-level data transmission signal DS to the receiving side at the expiration of a predetermined period of time $t_1$. In response to receipt of the high-level data transmission signal DS, the receiving side reads the i-th item of data $DT_i$ and sends a high-level data reception signal DR to the transmitting side. The transmitting side ends the transmission cycle for the i-th item of data upon receiving the high-level data reception signal DR. After transmitting the next or (i+1)th item of data $DT_{i+1}$, the transmitting side sends a low-level data transmission signal DS at the expiration of the predetermined period of time $t_1$. In response to receipt of the low-level data transmission signal DS, the receiving side reads the (i+1)th item of data $DT_{i+1}$ and sends a low-level data reception signal DR to the transmitting side. The transmitting side ends the transmission cycle for the (i+1)th item of data upon receiving the low-level data reception signal DR. In subsequent data transmissions, data are successively transmitted by repeating the i-th and (i+1)th data transmission cycles.

Figure 5:
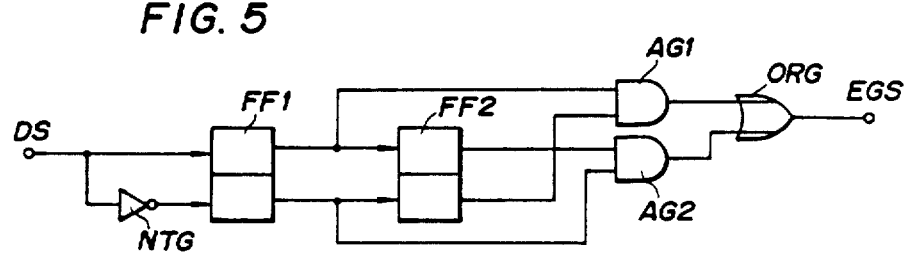
FIG. 5 is a circuit diagram of a differentiating circuit in FIG. 4.
Figure 4:
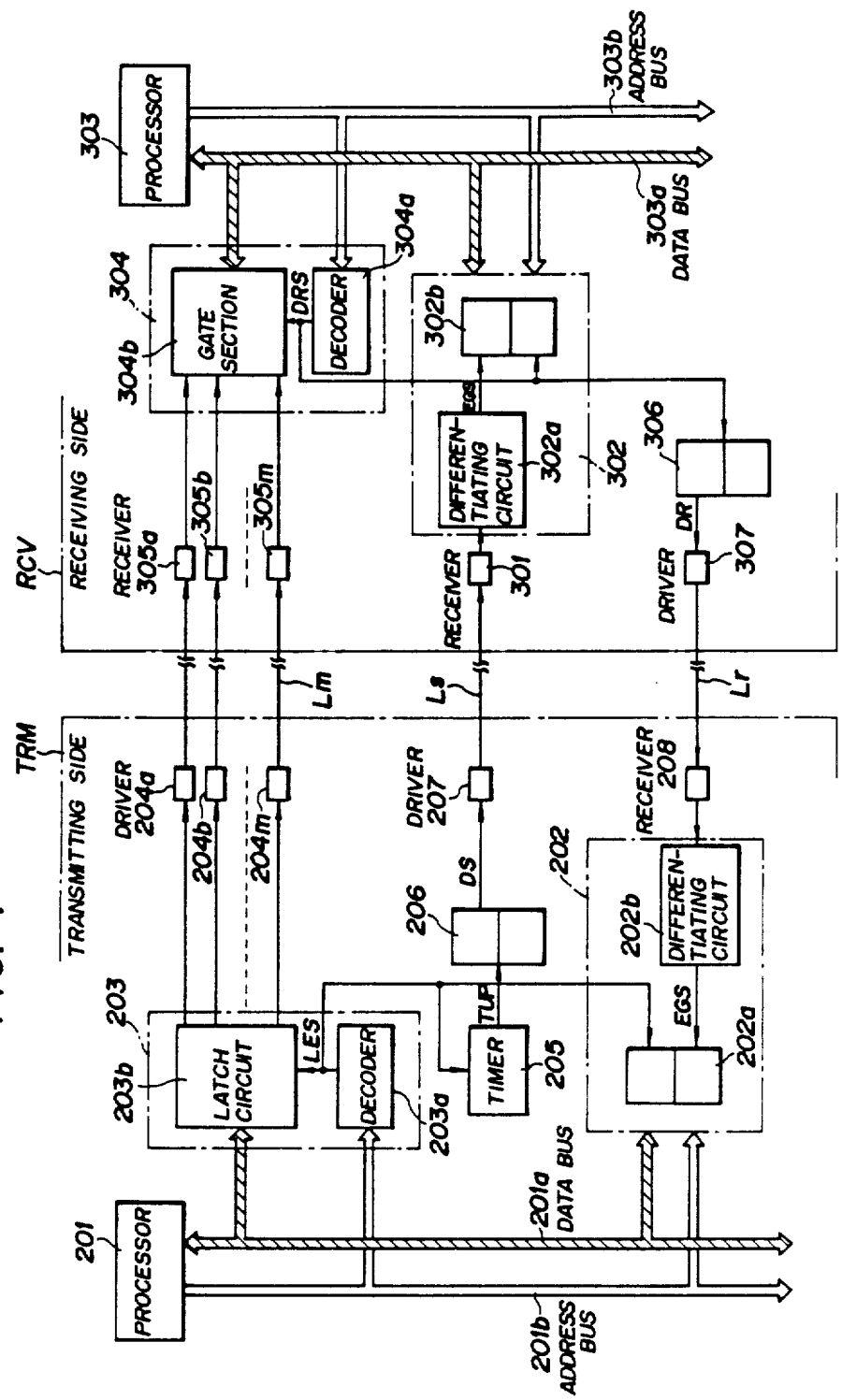
FIG. 4 is a block diagram of a system for practicing the data transmission method of the present invention.

FIG. 4 is a block diagram of a system for practicing the data transmission method of the present invention, and FIG. 5 is a circuit diagram of a differentiating circuit in FIG. 4. The data transmission method of the present invention will now be described in conjunction with FIGS. 3 through 5.

When an item of data $DT_i$ is to be transmitted from a transmitting side TRM such as an NC unit to a receiving side RCV such as a machine tool, a processor 201 on the transmitting side checks to determine whether a state in which a data transmission is possible exists. Specifically, if an R-S flip-flop 202a in a transmission state memory 202 has been reset, the prevailing state is one in which a data transmission can be made (i.e., waiting). If the R-S flip-flop 202a has been set, a transmission is in progress and the prevailing state is one in which transmission is impossible (i.e., busy). Before a data transmission is made, therefore, the processor 201 checks to determine whether the flip-flop 202a is in the set or reset state. Note that the flip-flop 202a is in the reset state at the start of a data transmission operation.

When the flip-flop 202a is in the reset state, the processor 201 places the data for transmission on a data bus 201a and delivers an address of a parallel data memory 203 on an address bus 201b.

A decoder 203a in the parallel data memory 203 decodes the address signal and generates a latch enable signal LES if the address signal is an address of the parallel data memory 203.

When the latch enable signal LES is generated, a latch circuit 203b stores the m-bit parallel data $DT_i$ placed on the data bus 201a and transmits these data to the receiving side RCV via driver circuits 203a-204m and the transmission line Lm.

In response to the latch enable signal LES, the flip-flop 202a is set, thereby indicating that a data transmission is in progress, and a timer 205 begins clocking time from the occurrence of the latch enable signal LES, the timer producing a time-up signal TUP upon lapse of the predetermined time $t_1$, thereby setting a J-K flip-flop 206.

When the flip-flop 206 is set, a set signal (the data transmission signal) DS from the flip-flop is transmitted to the receiving side RCV via a driver circuit 207 and the transmission line Ls.

The data transmission signal DS is applied to a differentiating circuit 302a in a data reception verifying unit 302 via a receiver 301 on the receiving side. As shown in FIG. 5, the differentiating circuit 302a is composed of two R-S flip-flops FF1, FF2, an AND gate AG1 for producing the logical product of the set output from the first flip-flop FF1 and the reset output of the second flip-flop FF2, an AND gate AG2 for producing the logical product of the reset output from the first flip-flop FF1 and the set output of the second flip-flop FF2, an OR gate ORG for producing the logical sum of the outputs from these AND gates, and a NOT gate NTG. The data transmission signal DS is applied to the set input terminal of the first flip-flop FF1 directly and to the reset input terminal of the first flip-flop FF1 through the NOT gate NTG. When the data transmission signal DS rises from the low level to the high level and when it falls from the high level to the low level, the OR gate ORG generates an edge signal EGS having a duration of one clock.

Accordingly, when the high-level data transmission signal DS sent by the transmitting side TRM is applied to the differentiating circuit 302a, the latter generates the edge signal EGS, which sets an R-S flip-flop 302b.

A processor 303 on the receiving side RCV checks the set/reset state of the flip-flop 302b at a predetermined short period or in a short interval and, hence, immediately senses when the flip-flop is set.

Upon verifying that the flip-flop 302b has been set, the processor 303 sends an address signal to a data receiving unit 304 on an address bus 303b.

A decoder 304a in the data receiving unit 304 decodes the address signal and produces a data read signal DRS if the address signal is an address of the data receiving unit 304.

When the data read signal DRS is generated, a gate section 304b places the parallel data $DT_i$, which arrives via receivers 305a-305m, on a data bus 303a, the parallel data $DT_i$ being read in by the processor 303.

In response to the data read signal DRS, the flip-flop 302b is reset and a J-K flip-flop 306 for generating the data reception signal DR is set. When the flip-flop 306 is set, a set signal (the data transmission signal) DR from this flip-flop is sent to the transmitting side TRM via a driver circuit 307 and transmission line Lr.

The data reception signal DR is applied to the differentiating circuit 202b of transmission state memory 202 via a receiver 208 on the transmitting side. The differentiating circuit 202b, which has the construction shown in FIG. 5, produces the edge signal EGS when the data reception signal DR rises from the low level to the high level and falls from the high level to the low level. Accordingly, the differentiating circuit 202b generates the edge signal EGS in response to receipt of the high-level data reception signal DR, and the flip-flop 202a is reset by the edge signal. Thus, a state enabling transmission of the next item of data is established and the transmission cycle of the i-th item of parallel data $DI_i$ ends.

Next, the processor 201 on the transmitting side TRM verifies the fact that the flip-flop 202a has been reset (i.e., that the prevailing state is one in which transmission is possible), places the (i+1)th item of parallel data $DT_{i+1}$ to be transmitted next on the data bus 201a, and sends an address signal to the parallel data memory 203 on the address bus 201b.

As set forth above, the decoder 203a of the parallel data memory 203 generates the latch enable signal LES in response to the address signal, the latch circuit 203b stores the m-bit parallel data $DI_{i+1}$ placed on the data bus 201a, and these data are delivered to the receiving side RCV via the driver circuits 204a–204m and transmission line $L_m$.

In response to the latch enable signal LES, the flip-flop 202a is set, thereby indicating that a data transmission is in progress, and the timer 205 generates the time-up signal TUP upon passage of the time $t_1$ from occurrence of the latch enable signal. The time-up signal is applied to the J-K flip-flop 206.

Since the J-K flip-flop 206 is in the set state due to the previous transmission cycle, the flip-flop is reset by the time-up signal TUP, so that the data transmission signal DS drops from the high level to the low level. The low-level data transmission signal DS is sent to the receiving side RCV through the driver circuit 207 and the transmission line Ls, and is applied to the differentiating circuit 302a of the data reception verifying unit 302 through the receiver 301.

The differentiating circuit 302a generates the edge signal EGS in response to the high to low level change of the data transmission signal DS, thereby setting the flip-flop 302b.

When the processor 303 on the receiving side verifies the set state of the flip-flop 302b in the above-described manner, the processor 303 sends an address signal to the data receiving unit 304 on the address bus 303b.

In response to the address signal, the decoder 304a of the data receiving unit 304 generates the data read signal DRS. In response to generation of the data read signal DRS, the gate section 304b delivers the parallel data $DT_{i+1}$, which arrives via the receivers 305a–305m, to the data bus 303a. The parallel data are read by the processor 303.

Further, the flip-flop 302b is reset by generation of the data read signal DRS, and so the J-K flip-flop 306 is set by the preceding data transmission cycle.

When the J-K flip-flop 306 is reset, the data reception signal DR falls from the high level to the low level, and the low-level data reception signal DR is sent to the transmitting side TRM via the driver circuit 307 and the transmission line Lr and applied to the differentiating circuit 202b of the transmission state memory 303 via the receiver 208.

The differentiating circuit 202b generates the edge signal EGS in response to the high to low level change of the data reception signal DR, thereby resetting the flip-flop 202a. As a result, a state is established in which the next data transmission is possible and the transmission cycle for the (i+1)th item of parallel data $DT_{i+1}$ ends. Note that the states of flip-flops 202a, 206, 302b, 306 in FIG. 4 at the instant the (i+1)th parallel data transmission cycle ends are the states that prevailed before the start of the i-th parallel data transmission cycle.

Thereafter, parallel data are successively transmitted while repeating the i-th parallel data transmission sequence and (i+1)th parallel data transmission sequence.

As described above, the arrangement is such that a transmission cycle for a first item of parallel data is completed by the three steps of (1) transmitting parallel data $DT_i$, (2) sending the high-level data transmission signal DS, and (3) reading the parallel data $DT_i$ in response to receipt of the high-level data transmission signal and sending back the high-level data reception signal DR; a subsequent transmission cycle for the second item of parallel data is completed by the three steps of (1)' transmitting parallel data $DT_{i+1}$, (2)' sending the low-level data transmission signal DS, and (3)' reading the parallel data in response to receipt of the low-level data transmission signal and sending back the low-level data reception signal DR; and data transmission is subsequently carried out by repeating the transmission cycles of the first and second parallel data each time a parallel data transfer takes place. Accordingly, data transmission time can be shortened and the data transmission can be carried out in reliable fashion.

Though the present invention is applied to transmission of data from an NC unit to a machine tool in the case described above, it goes without saying that the invention is not limited to such an application.

We claim:

1. A data transmission method using a transmitting device and a receiving device, comprising the steps of:
   (a) transmitting, by the transmitting device, an ith item of data to the receiving device;
   (b) sending, by the transmitting device, a high-level data transmission signal to the receiving device at the expiration of a predetermined period of time after transmitting the ith item of data;
   (c) reading, by the receiving device, the ith item of data in response to the high-level data transmission signal and sending a high-level data reception signal to the transmitting device;
   (d) receiving, by the transmitting device, the high-level data reception signal and the transmitting device changing to a state in which the next (i+1)th data transmission is possible;
   (e) sending, after transmitting the next (i+1)th item of data, by the transmitting device, a low-level data transmission signal to the receiving device at the expiration of the predetermined period of time;
   (f) reading, in response to receipt of the low-level data transmission signal, by the receiving device, said (i+1)th item of data and sending a low-level data reception signal to the transmitting device; and
   (g) receiving, by the transmitting device, the low-level data reception signal and the transmitting device changing to a state in which the next data transmission is possible.

2. A data transmission method according to claim 1, wherein said data are parallel data.

3. A data transmission method according to claim 2, wherein said transmitting device includes data transmitting means, means for clocking time following a data transmission and for generating a time-up signal when a predetermined period of time has expired, means for alternately outputting a high-level data transmission signal and a low-level data transmission signal whenever the time-up signal is generated, and memory means for storing whether a prevailing state is a state in which a data transmission is possible, and said receiving device includes means for verifying receipt of parallel data by sensing a change in the level of said data transmission signal, means for reading the parallel data, and means for establishing a state in which a data transmission is possible by alternately applying a high-level data reception signal and a low-level data reception signal to said memory means of the transmitting device whenever the parallel data are read.

4. A data transmission and receiving method performed by transmitting and receiving devices, comprising the steps of:
   (a) transmitting first data by the transmitting device;
   (b) changing a level of a data transmission signal, by the transmitting device, after the first data is transmitted;
   (c) reading, by the receiving device, the transmitted first data after the change in the level of the data transmission signal is detected by the receiving device;
   (d) changing a level of a data reception signal, by the receiving device, after the transmitted first data is read;
   (e) transmitting second data, by the transmitting device, after the change in the level of the data reception signal is detected by the transmitting device;
   (f) changing the level of the data transmission signal, by the transmitting device, after the second data is transmitted;
   (g) reading, by the receiving device, the transmitted second data after the change in the level of the data transmission signal is detected by the receiving device; and
   (h) changing the level of the data reception signal, by the receiving device, after the transmitted second data is read.

5. A method as recited in claim 4a, wherein steps (b) and (d) change the level to a first level and steps (f) and (h) change the level to a second level.

6. A method as recited in claim 4, further comprising changing, by the receiving device, to a busy state when the level of the data transmission signal is changed and changing, by the receiving device, to a waiting state when the change in the level of the date reception signal is detected.

7. A method as recited in claim 4, wherein the change in level of the data transmission signal occurs a predetermined time after either the first or second data is transmitted.

8. A data transmitting and receiving system, comprising:
   transmitting means for transmitting the data;
   transmitting signal means, coupled to said transmitting means, for producing and alternating between two levels of a data transmission signal after each transmission of data;
   transmission signal detecting means, coupled to said transmitting signal means, for detecting the change in level of the data transmission signal;
   reading means, coupled to said transmitting means and said transmission signal detecting means, for reading the transmitted data after the change in level of the data transmission signal is detected;
   reception signal means, coupled to said reading means, for producing and alternating between two levels of a data reception signal after reading and after each detection of change in level of the data transmission signal; and
   reception signal detecting means, coupled to said reception signal means and said transmitting means, for detecting the changes in level of the data reception signal and said transmitting means transmitting additional data after the change in level of the data reception signal is detected.

9. A system as recited in claim 8, wherein said transmission signal means comprises:
   a timer operatively connected to said transmitting means; and
   a flip-flop operatively connected to said timer and said transmission signal detecting means.

10. A system as recited in claim 8, wherein said transmission signal detecting means comprises:
    a differentiating circuit operatively connected to said transmission signal means; and
    a flip-flop operatively connected to said differentiating circuit and said reading means.

11. A system as recited in claim 8, wherein said reception signal means comprises a flip-flop operatively connected to said reading means and said reception signal detecting means.

12. A system as recited in claim 8, wherein said reception signal detecting means comprises:
    a differentiating circuit operatively connected to said reception signal means; and
    a flip-flop operatively connected t said differentiating circuit and said transmitting means.

13. A system as recited in claim 8, further comprising
    a data bus connected between said transmitting means and said reading means;
    a first signalling line connected between said transmitting signal means and said transmission signal detecting means; and
    a second signalling line connected between said reception signal means and said reception signal detecting means.

* * * * *

UNITED STATES PATENT AND TRADEMARK OFFICE
CERTIFICATE OF CORRECTION

PATENT NO. : 4,773,040

DATED : September 20, 1988

INVENTOR(S) : Nagamine et al.

It is certified that error appears in the above-identified patent and that said Letters Patent is hereby corrected as shown below:

Title page:

Abstract, line 23, "th" should be --the--.

Col. 8, line 39, "t" should be --to--.

Signed and Sealed this

Seventh Day of March, 1989

Attest:

DONALD J. QUIGG

*Attesting Officer*   *Commissioner of Patents and Trademarks*